US012802715B2

(12) United States Patent

Lin

(10) Patent No.: US 12,802,715 B2
(45) Date of Patent: Nov. 17, 2026

(54) LIQUID-BEARING TONEARM DEVICE

(71) Applicant: Saul Lin, Kaohsiung City (TW)

(72) Inventor: Saul Lin, Kaohsiung City (TW)

( * ) Notice: Subject to any disclaimer, the term of this patent is extended or adjusted under 35 U.S.C. 154(b) by 0 days.

(21) Appl. No.: 18/819,899

(22) Filed: Aug. 29, 2024

(65) Prior Publication Data

US 2026/0011343 A1 Jan. 8, 2026

(30) Foreign Application Priority Data

Jul. 2, 2024 (TW) ................................ 113124679

(51) Int. Cl.
*G11B 3/31* (2006.01)
*G11B 3/085* (2006.01)
*G11B 3/12* (2006.01)
*G11B 3/14* (2006.01)

(52) U.S. Cl.
CPC ........... *G11B 3/31* (2013.01); *G11B 3/08532* (2013.01); *G11B 3/125* (2013.01); *G11B 3/14* (2013.01)

(58) Field of Classification Search
None
See application file for complete search history.

(56) References Cited

U.S. PATENT DOCUMENTS 2,869,877 A * 1/1959 Bard ...................... G11B 3/095
3,101,952 A * 8/1963 Godfrey ................... G11B 3/20
3,235,267 A * 2/1966 Rangabe .................. G11B 3/38 369/255
3,479,038 A * 11/1969 Eisner ...................... G11B 3/20 369/255
4,346,467 A * 8/1982 Souther .................... G11B 3/38 369/249.1
4,455,641 A * 6/1984 Sliski ....................... G11B 3/38 369/252
9,019,806 B1 4/2015 Bowden, Sr.
2004/0005138 A1 1/2004 Yano et al.
2024/0420731 A1* 12/2024 Huang ..................... G11B 3/12
(Continued)

FOREIGN PATENT DOCUMENTS

CN 216084304 U 3/2022
JP S5877003 A 5/1983
JP 7177565 B1 * 11/2022
(Continued)

*Primary Examiner* — William J Klimowicz
(74) *Attorney, Agent, or Firm* — Hershkovitz & Associates, PLLC; Abe Hershkovitz

(57) ABSTRACT

A liquid-bearing tonearm device is configured to read a record on a turntable and comprises a base seat, a liquid tank and a cartridge assembly. The liquid tank is mounted at the base seat, disposed over the turntable, elongated along a linear direction, and has a containing chamber containing working liquid. The cartridge assembly floats on the liquid tank through a floating piece and has a stylus portion and a counterweight portion. The liquid-bearing tonearm device is used with the turntable to play music. A cartridge is assembled to the stylus portion and contacts grooves of the record to read vibrations and signals. When the turntable spins the record, the cartridge assembly floats in the liquid tank and is moved along the linear direction with the cartridge pulled inwardly by the record. So, a contacting angle between the cartridge and the grooves remains parallel, thereby enhancing reading quality.

16 Claims, 13 Drawing Sheets

(56) References Cited

U.S. PATENT DOCUMENTS

2025/0259645 A1 * 8/2025 Fujioka .................... G11B 3/38

FOREIGN PATENT DOCUMENTS

| | | | |
|---|---|---|---|
| JP | 2024018848 | A | 2/2024 |
| RU | 2463675 | C1 * | 10/2012 |
| TW | M655104 | U | 5/2024 |
| TW | M665008 | U | 1/2025 |
| WO | 2024024907 | A1 | 2/2024 |

* cited by examiner

LIQUID-BEARING TONEARM DEVICE

BACKGROUND OF THE INVENTION

1. Field of the Invention

The present invention relates to a liquid-bearing tonearm device, which is used with a turntable and a vinyl record to play music.

2. Description of Related Art

A conventional vinyl record player comprises a turntable and a tonearm device. A record can be placed on the turntable. One kind of the tonearm device is a curved tonearm, which is disposed adjacently to the turntable and comprises a bearing and an arm rod. An end of the arm rod is mounted at the bearing, is vertically movable and is pivotable for certain degrees. A cartridge, having a needle, is assembled to a front side of the arm rod. A counterweight is assembled to a rear side of the arm rod to balance the cartridge. When playing music, the needle contacts grooves of the record, which is on the turntable, then, the turntable is turned on to spin the record, so that the needle picks up the vibrations while contacting the record's grooves. The cartridge then transmits the vibrations to the amplifier and the speaker through wires, so the speaker plays the music in the record.

The grooves on the record are spiral and run from the outside of the record to the inside. When playing music, the needle is put on one of the grooves at the outside of the record and contacts the groove. While playing, the needle is moved along the groove and gradually moved from the outside of the record to the inside. At the same time, the arm rod and the cartridge are slowly swung so the needle can keep contacting the groove.

However, while playing music, angles of the arm rod of the curved tonearm and the cartridge will change, so the needle cannot remain parallel to the groove. That being said, a contact angle between the needle and a groove at the outside of the record is different from the contacting angle at the inside of the record, affecting quality of reading the vibrations and signals, thus affecting sound quality of the music and needing to be improved.

To resolve the aforementioned shortcomings of the conventional curved tonearm, there is another kind of the tonearm device, which is an air-bearing tangential tonearm comprising an air compressor, an air tube and a tube slot. The air tube is horizontally mounted over the turntable and the record, and is spaced apart from the record. The air tube is a long cylinder having numerous fine holes. The tube slot is located at the air tube, is slidable along the air tube, and has a counterweight and a cartridge respectively mounted at two sides of the tube slot. The air compressor is connected to the air tube and charges air into the air tube, then the air is discharged from the fine holes of the air tube. The rapid flow of the air can reduce friction between the air tube and the tube slot to allow the tube slot to smoothly slide along the air tube horizontally and swing up and down around the air tube. Therefore, the needle of the cartridge and the grooves of the record remain parallelly in contact to better read the vibrations and signals.

However, the air-bearing tangential tonearm has the following drawbacks. First, when operating, the air compressor is noisy, while a highly silent air compressor is expensive in manufacture, so raising the cost. Second, to make the tube slot able to slide smoothly on the air tube, a gap between the tube slot and the air tube must be fine and precise, making the tube slot and the air tube hard and expensive to manufacture. Third, because air flows rapidly through the tube slot, the tube slot will also vibrate subtly and rapidly, and the cartridge on the tube slot hence will vibrate, affecting the quality of reading the vibrations and signals, and thus affecting sound quality.

SUMMARY OF THE INVENTION

A liquid-bearing tonearm device in accordance with the present invention resolves drawbacks that a curved tonearm, which swings an arm rod to make a needle constantly contact grooves of a record, has contact-angle differences between the needle and the grooves, thus affecting sound quality of the music, and that an air-bearing tangential tonearm is costly and hard to manufacture, and the sound quality is still affected by vibrations.

The liquid-bearing tonearm device is configured to read a record on a turntable and reads music signals of grooves of the record in a better way to improve reading quality. The liquid-bearing tonearm device comprises a base seat, a liquid tank, and a cartridge assembly. The base seat is disposed adjacent to the turntable. The liquid tank is mounted at the base seat, is disposed over the turntable and the record, and is spaced apart from the record. The liquid tank is elongated along a linear direction and has a containing chamber and a tank opening. The containing chamber is disposed inside the liquid tank and contains working liquid. The tank opening is disposed on a top side of the liquid tank and communicates with the containing chamber. The cartridge assembly is placed at the liquid tank and comprises a floating piece and a supporting rack. The floating piece is disposed at the containing chamber of the liquid tank. The supporting rack is mounted through the tank opening of the liquid tank to connect the floating piece and has a stylus portion and a counterweight portion. The stylus portion and the counterweight portion are respectively disposed at two ends of the supporting rack and are respectively disposed at two sides of the liquid tank. A specific weight of the floating piece is smaller than a specific weight of the working liquid, such that the supporting rack floats on the working liquid in the liquid tank through the floating piece. By floating, the cartridge assembly is able to sway upwardly and downwardly and to be moved along the linear direction on the working liquid in the liquid tank. The stylus portion can contact the record to read grooves of the record.

The liquid-bearing tonearm device is used with the turntable to play music. The containing chamber of the liquid tank contains the working liquid, so the cartridge assembly can float on the working liquid in the liquid tank through the floating piece. A cartridge is assembled to the stylus portion, a needle of the cartridge contacts the grooves of the record on the turntable, and then music can be played through connected external speakers. While the record is spun, the cartridge assembly is moved along the linear direction from an outside to an inside of the record, so, a contacting angle between the needle of the cartridge and the grooves of the record can remain parallel. Therefore, the needle of the cartridge reads signals and vibrations in a better way to ensure sound quality of the music.

Furthermore, the cartridge assembly floats on the working liquid through the floating piece. Because the working liquid does not vibrate, it can stabilize the floating piece and block vibrations caused by external environment, thereby effectively improving the sound quality of the music.

DETAILED DESCRIPTION OF THE PREFERRED EMBODIMENT

Figure 1:
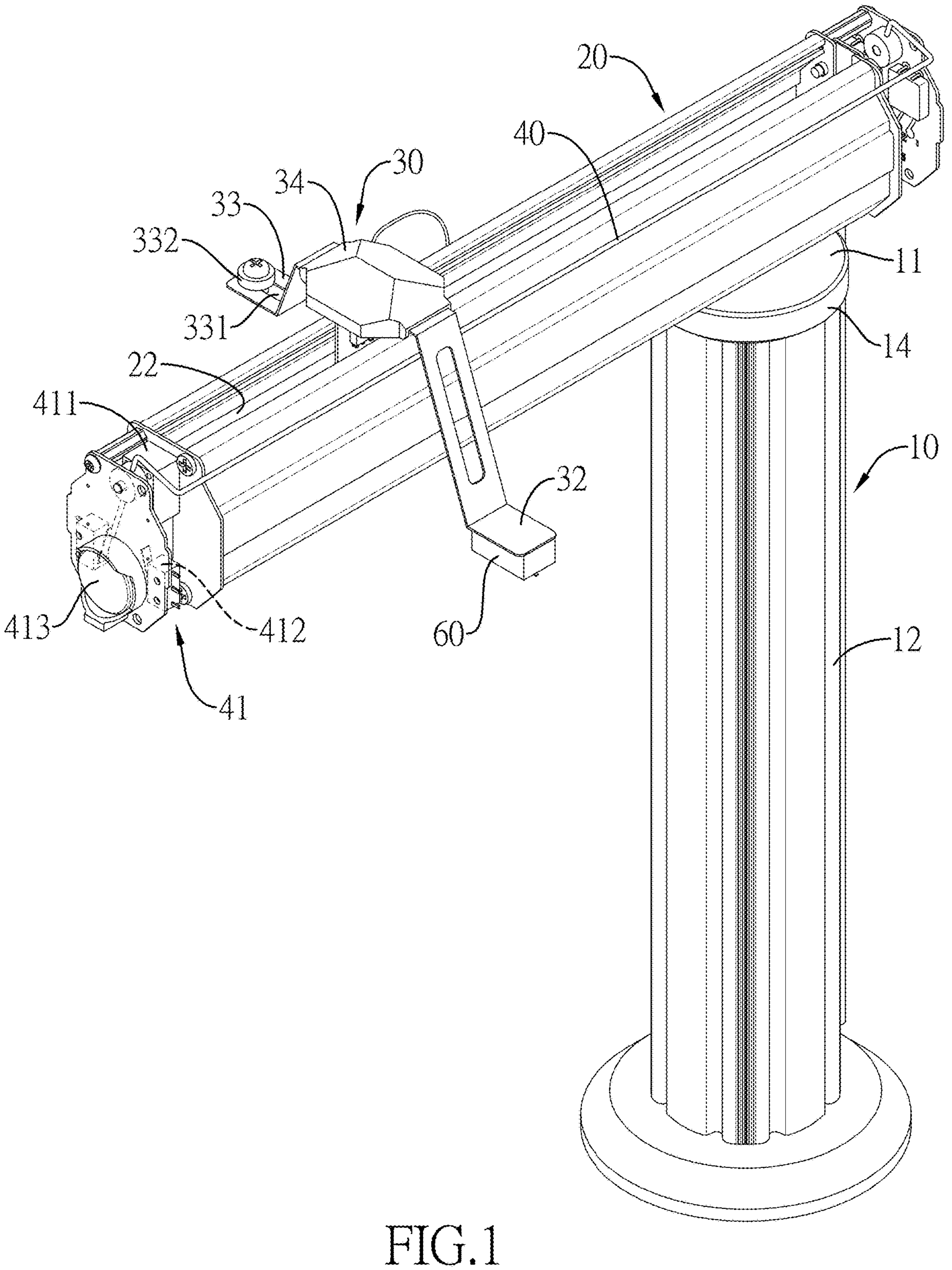
FIG. 1 is a perspective view of an embodiment of a liquid-bearing tonearm device in accordance with the present invention.

With reference to FIGS. 1 to 3 and 9, a liquid-bearing tonearm device in accordance with the present invention is configured to read a record 51 on a turntable 50 and comprises a base seat 10, a liquid tank 20 and a cartridge assembly 30.

Figure 2:
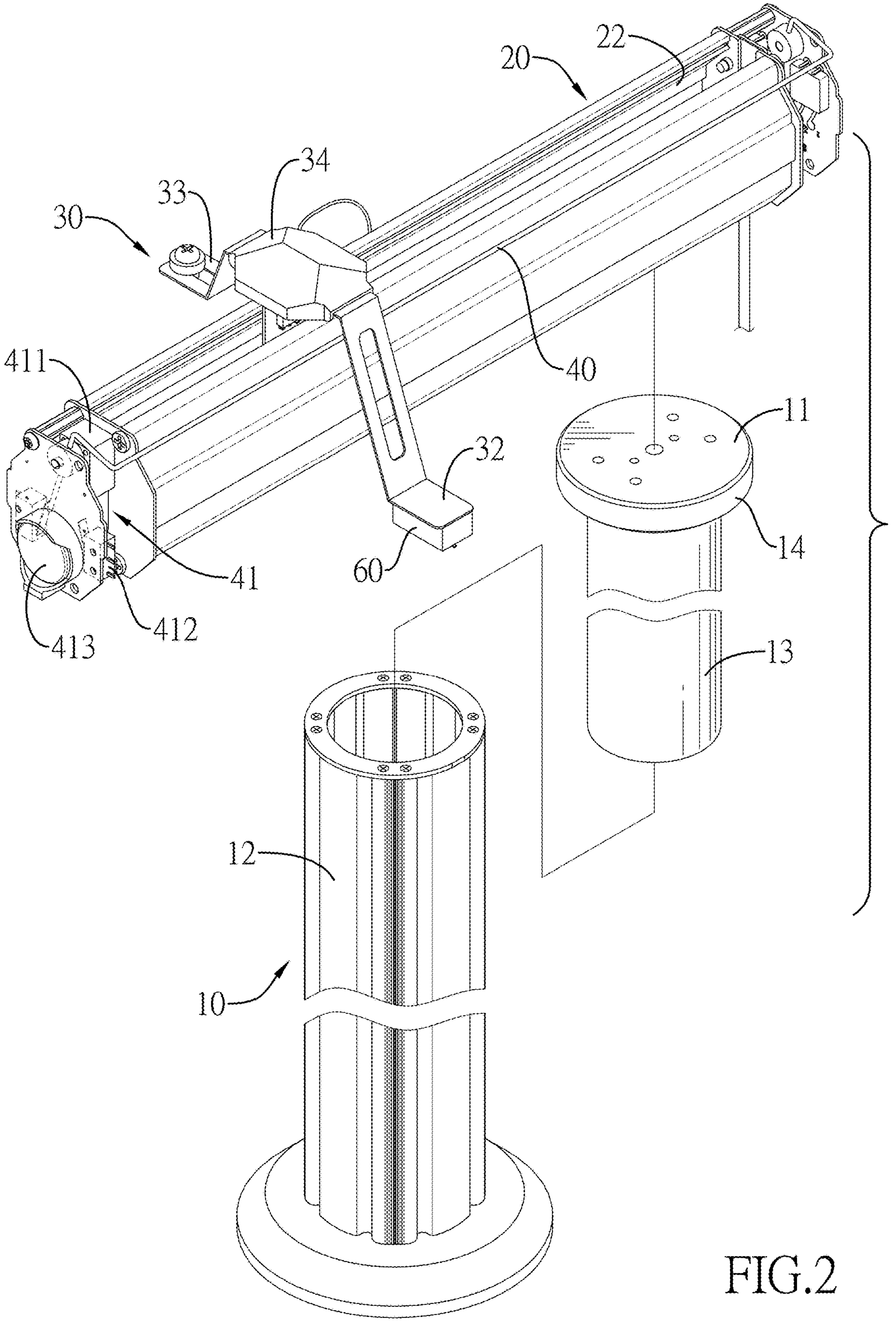
FIG. 2 is a partially-exploded view of the liquid-bearing tonearm device in FIG. 1.
Figure 3:
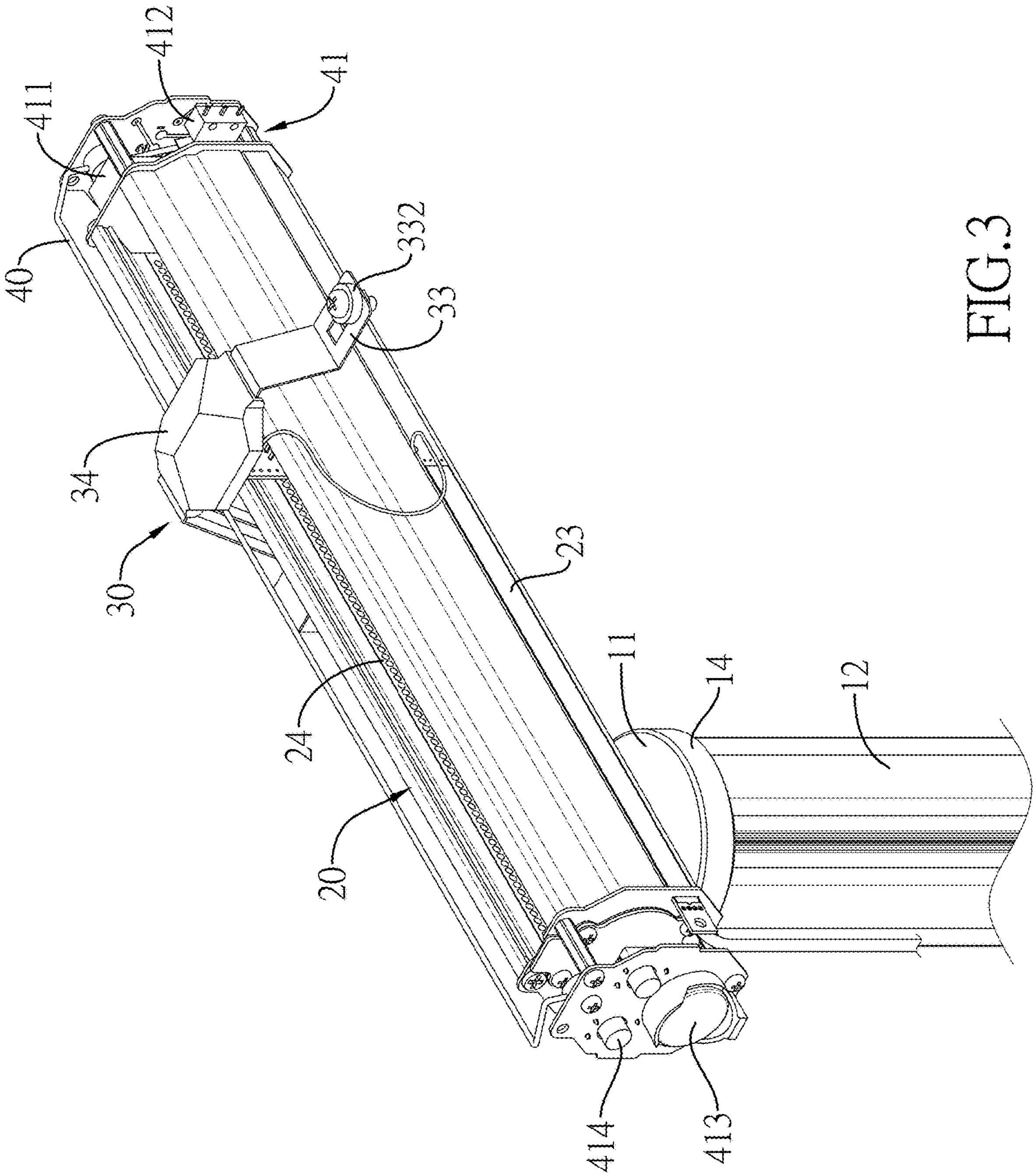
FIG. 3 is another perspective view of the liquid-bearing tonearm device in FIG. 1.
Figure 9:
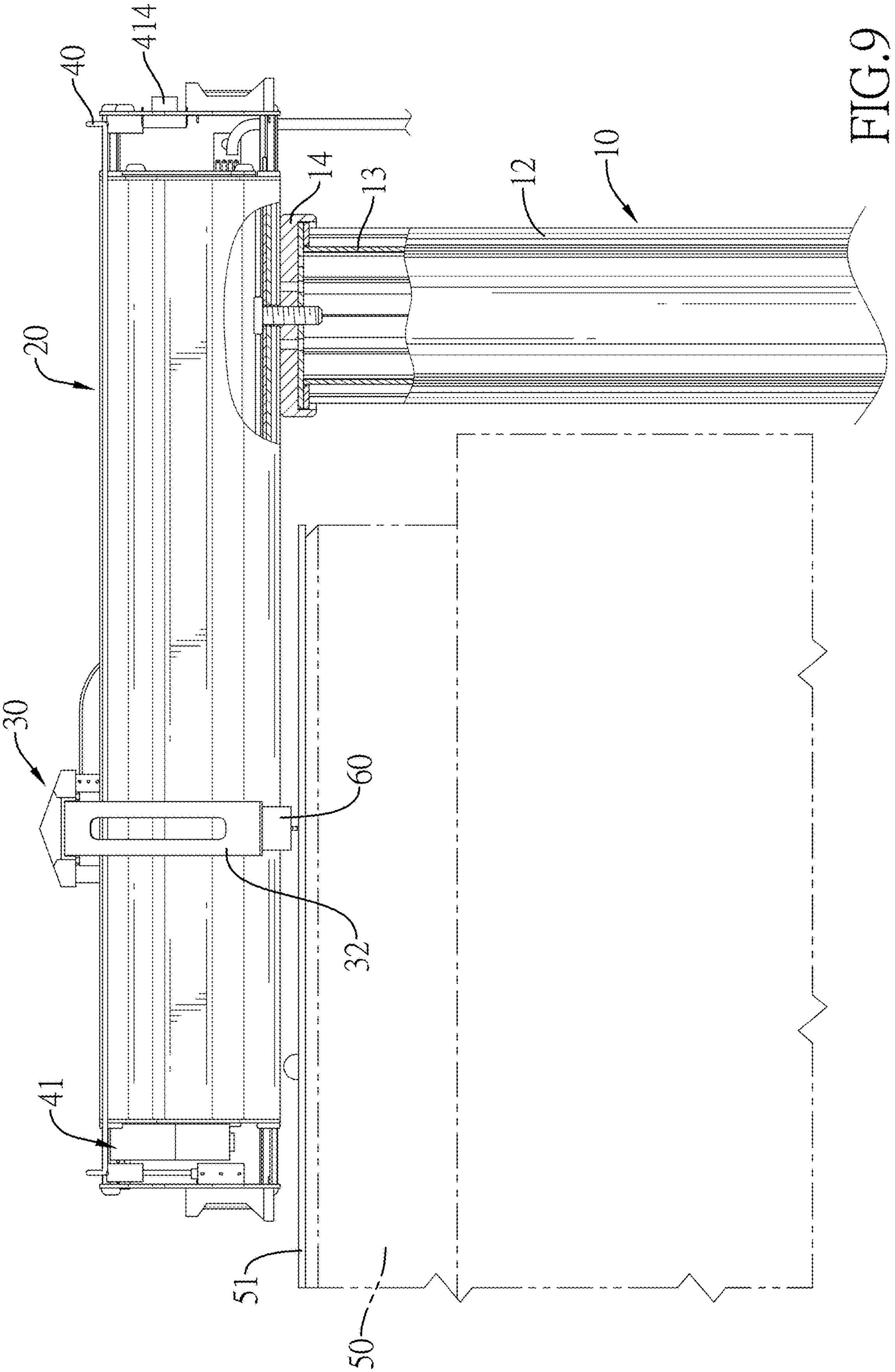
FIG. 9 is a side view of the liquid-bearing tonearm device in FIG. 1, used with a turntable.
Figure 10:
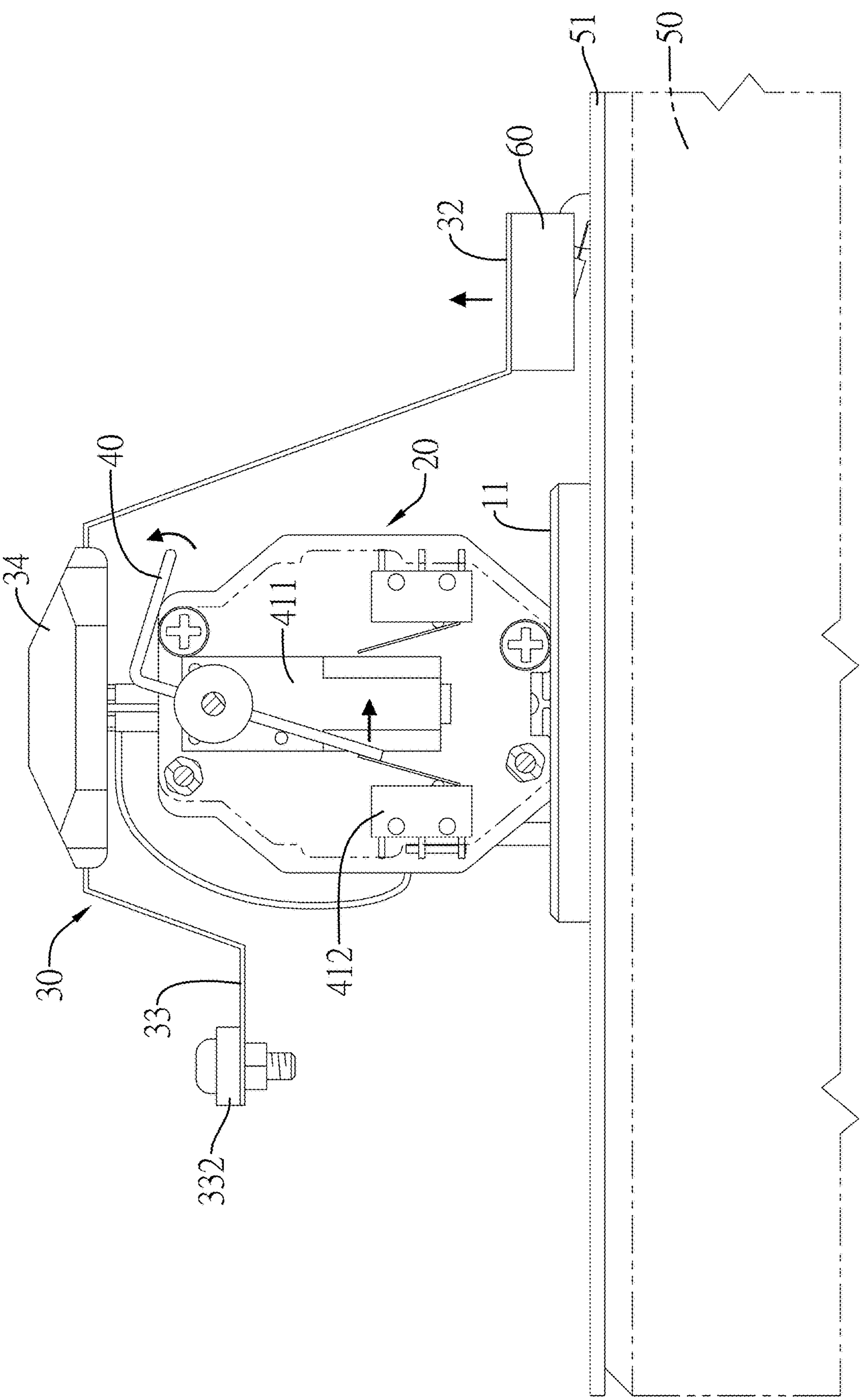
FIG. 10 is a sectional view across line 10-10 in FIG. 4.

As shown in FIG. 9, the base seat 10 is adjacent to the turntable 50. As shown in FIGS. 1 to 3, in a configuration of the base seat 10, the base seat 10 has an assembling portion 11, which is disposed on a top end of the base seat 10 and can be pivoted horizontally.

Figure 4:
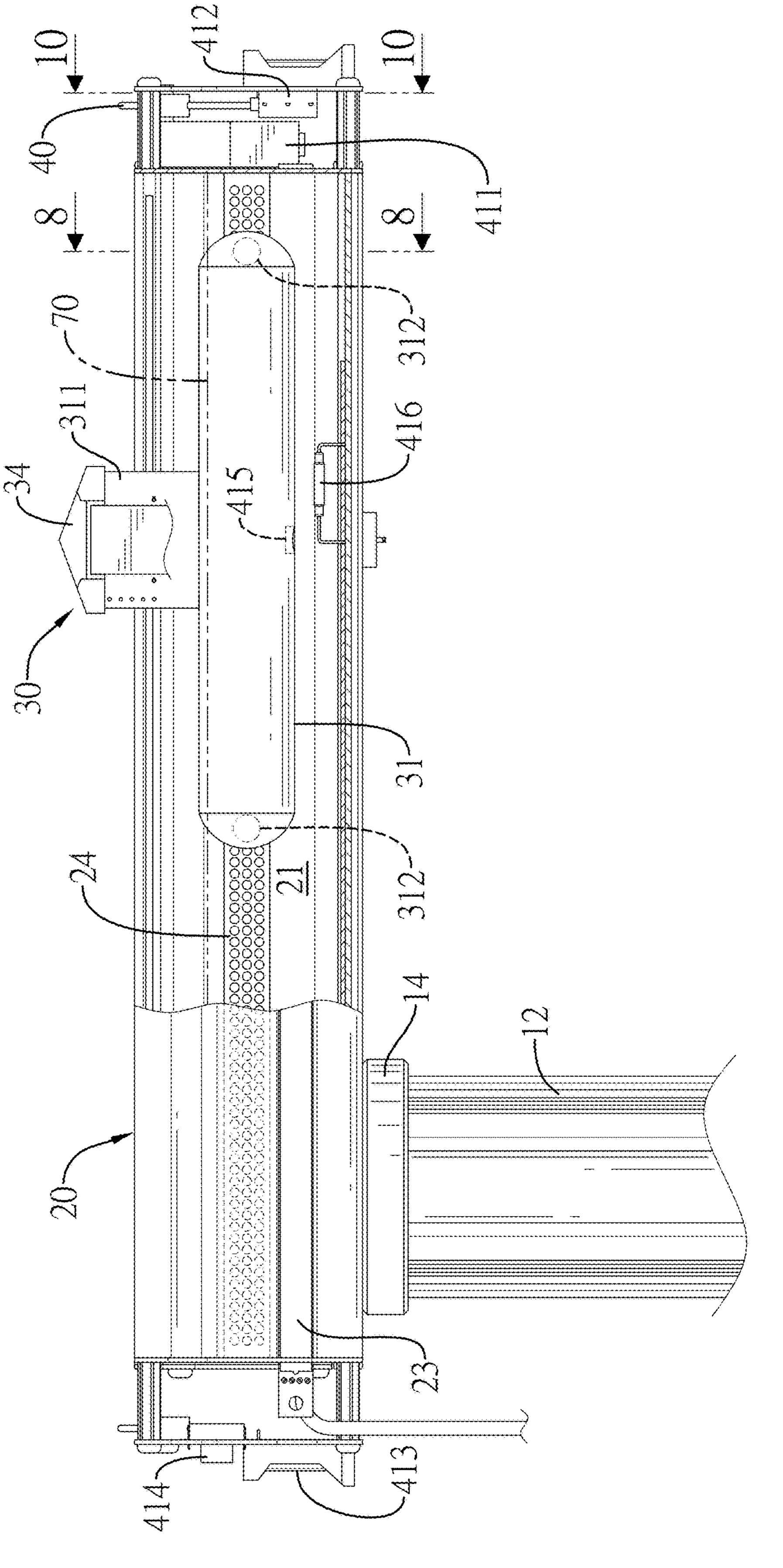
FIG. 4 is a partial sectional side view of the liquid-bearing tonearm device in FIG. 1.
Figure 8:
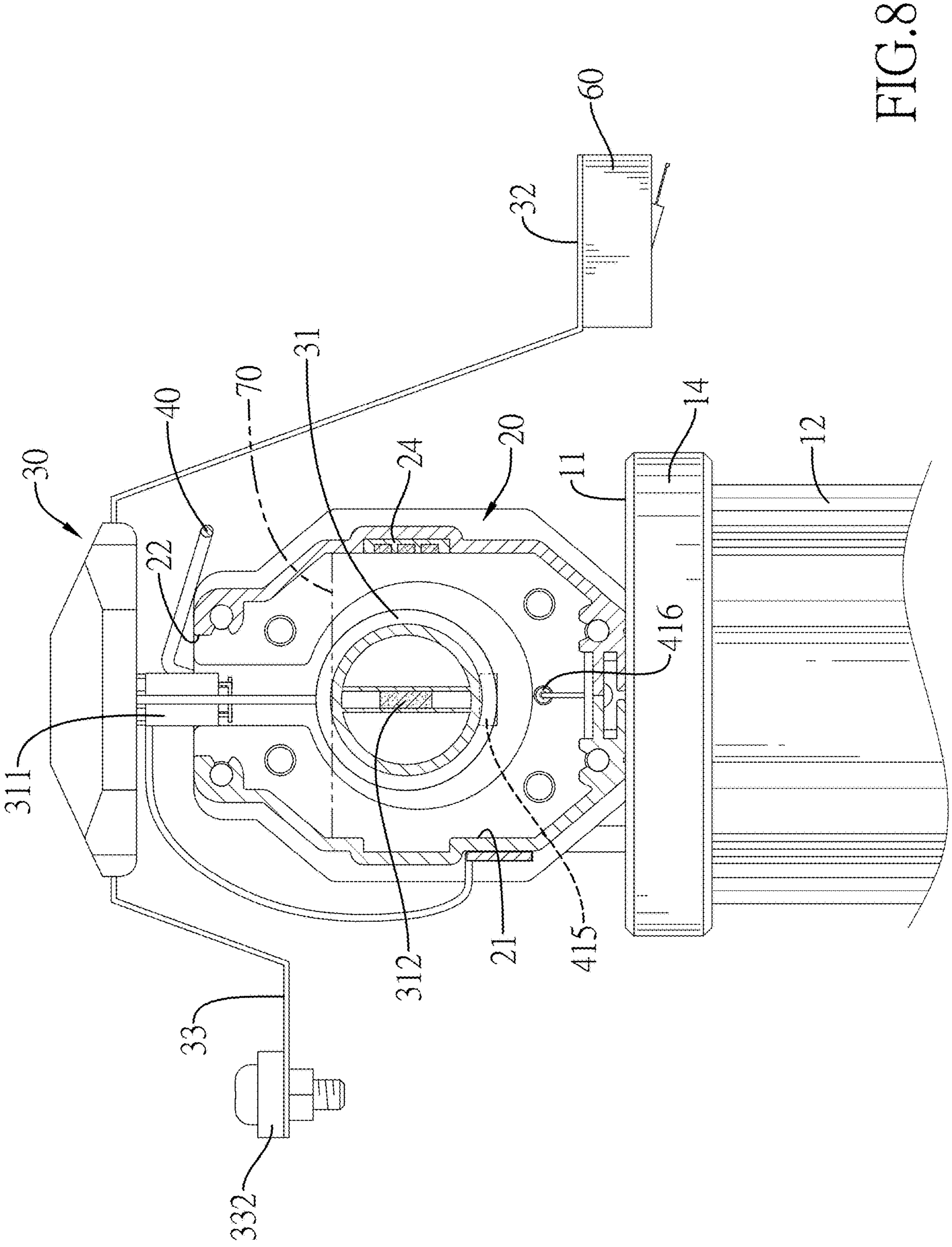
FIG. 8 is a sectional view across line 8-8 in FIG. 4.
Figure 11:
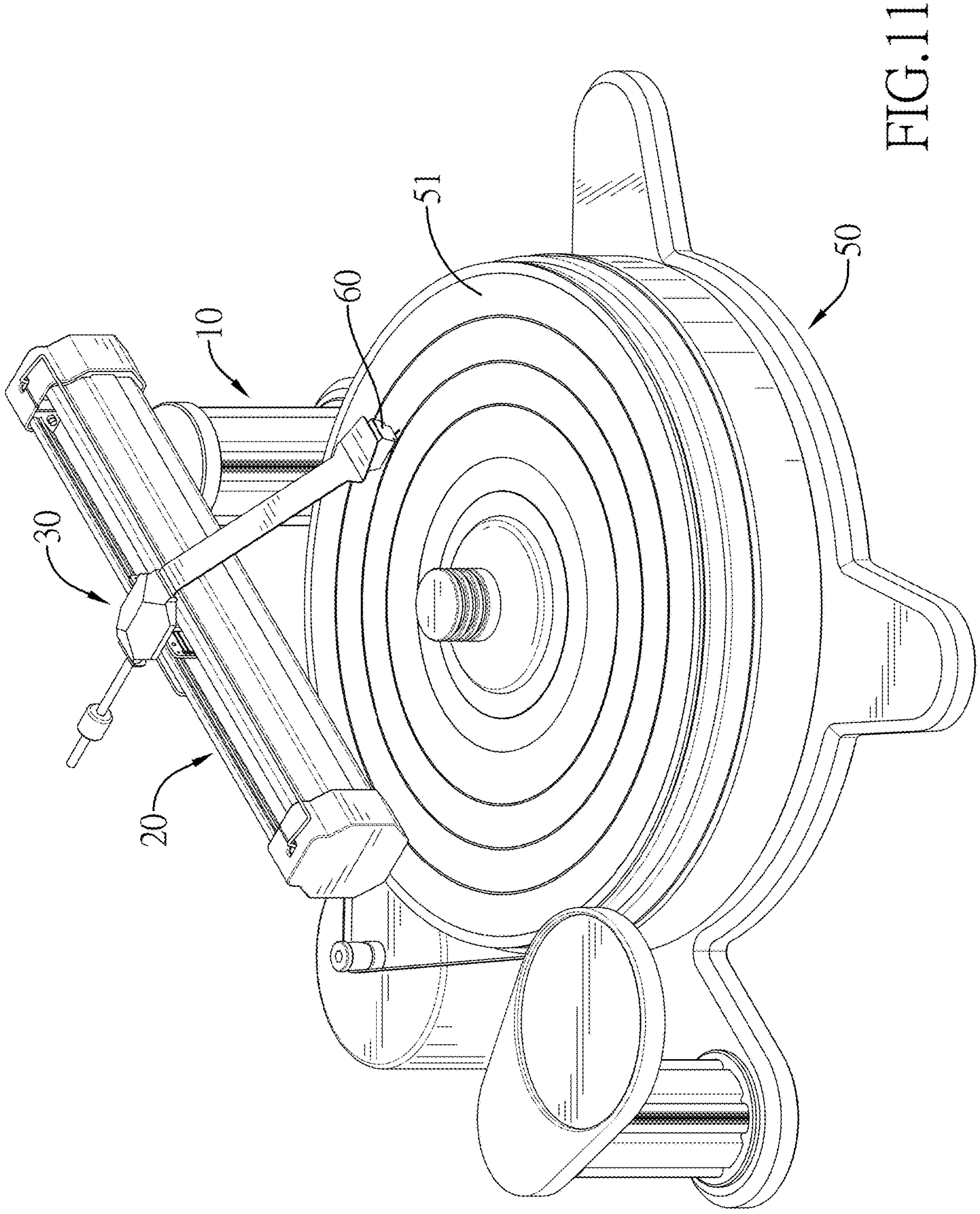
FIG. 11 is a perspective view of the liquid-bearing tonearm device, with a configuration of a base seat of the liquid-bearing tonearm device.
Figure 12:
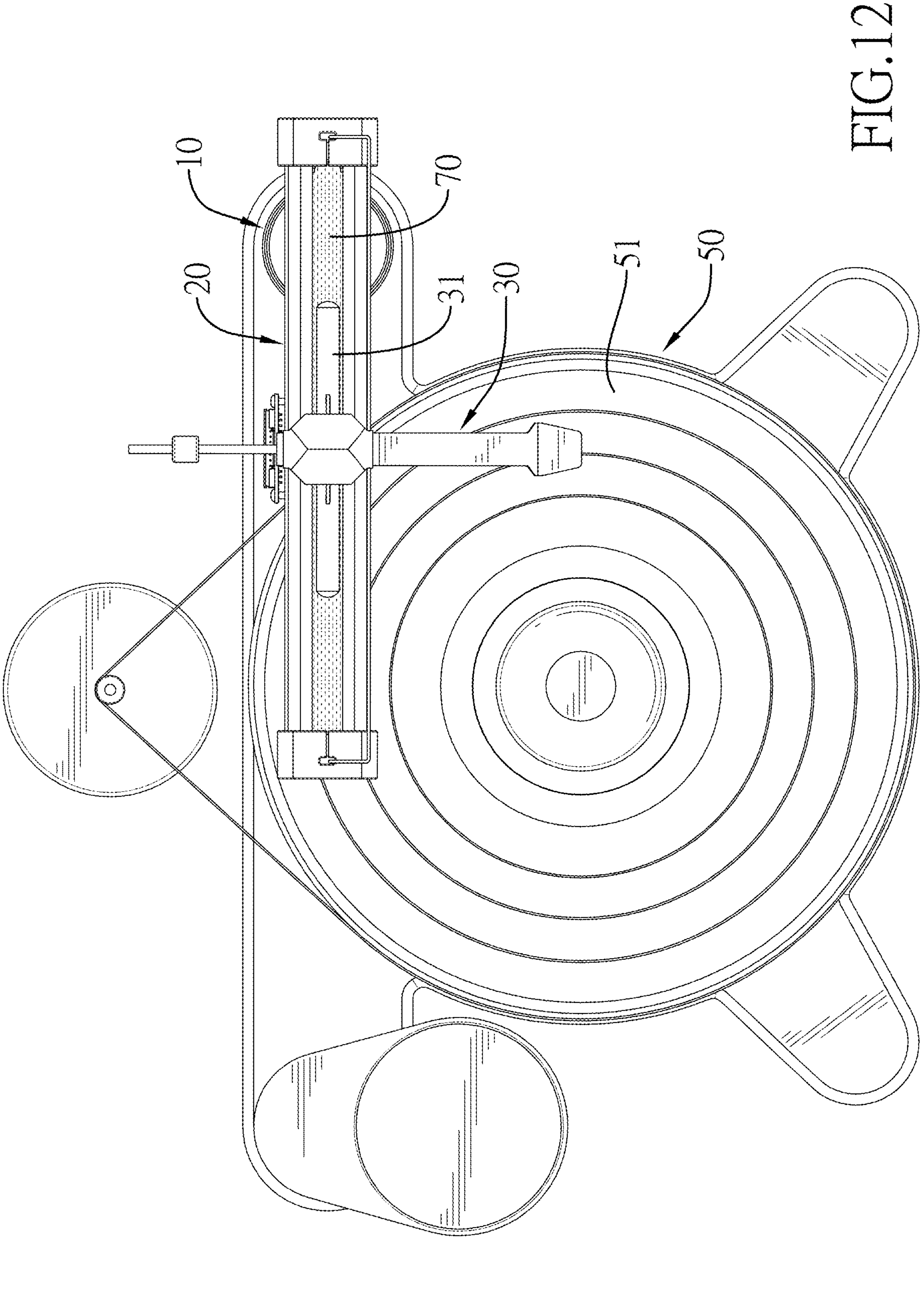
FIG. 12 is a top view of the liquid-bearing tonearm device in FIG. 11.

As shown in FIGS. 1 to 4, the liquid tank 20 is mounted at the base seat 10, is disposed over the turntable and the record 51 and is spaced apart from the record 51. The liquid tank 20 is elongated along a linear direction and has a containing chamber 21 containing working liquid. The liquid tank 20 has a tank opening 22 disposed on a top side of the liquid tank 20 and communicating with the containing chamber 21. The working liquid can be water or other liquids with good fluidity. A surface 70 of the working liquid is shown in FIGS. 4 and 8. As shown in FIGS. 11 and 12, the liquid tank 20 is disposed over and at a rear side of the turntable 50 and the record 51 to facilitate changing records.

As shown in FIGS. 4 to 8, the cartridge assembly 30 comprises a floating piece 31 and a supporting rack 34. The floating piece 31 is disposed at the containing chamber 21 of the liquid tank 20. A specific weight of the floating piece 31 is smaller than a specific weight of the working liquid. The supporting rack 34 passes through the tank opening 22 of the liquid tank 20 to connect the floating piece 31, so that the supporting rack 34 floats on the working liquid in the liquid tank 20. The supporting rack 34 has a stylus portion 32 and a counterweight portion 33, respectively disposed at two ends of the supporting rack 34 and respectively disposed at two sides of the liquid tank 20. By floating, the cartridge assembly 30 is able to sway upwardly and downwardly and to be moved along the linear direction on the working liquid in the liquid tank 20. The stylus portion 32 can contact the record 51 to read grooves of the record 51. In this embodiment, the cartridge assembly 30 is moved in the linear direction toward or away from the base seat 10.

As shown in FIGS. 8 and 9, the liquid-bearing tonearm device is used with the turntable 50 to play music. The containing chamber 21 of the liquid tank 20 contains the working liquid, so the cartridge assembly 30 can float in the liquid tank 20 through the floating piece 31. A cartridge 60 is assembled to the stylus portion 32 and a needle of the cartridge 60 contacts the grooves of the record 51 on the turntable 50, and then music can be played through connected external speakers. The cartridge assembly 30 floats on the liquid tank 20 through the floating piece 31 and can be moved along the linear direction of the liquid tank 20. While the record 51 is spun, the cartridge assembly 30 is moved along the linear direction from an outside to an inside of the record 51, so, a contacting angle between the needle of the cartridge 60 and the grooves of the record 51 can remain parallel. Therefore, the needle of the cartridge 60 reads signals and vibrations in a better way to ensure sound quality of the music.

Furthermore, the cartridge assembly 30 floats on the working liquid through the floating piece 31. The working liquid has characteristics of liquid and therefore does not vibrate, and can stabilize the floating piece 31 and block vibrations caused by external environment, thereby effectively improving the sound quality of the music. A conventional air-bearing tonearm has a tube slot located around an air tube, which has multiple air outlets. An air compressor delivers air into the air tube, and the air is then discharged from the air outlets to make the tube slot and a cartridge assembled on the tube slot float. However, using air to make the cartridge float leads to the fact that stability of the cartridge reading signals is significantly affected by vibrations of rapidly-flowing air. If the cartridge vibrates, the precision of reading signals and the sound quality will be affected. Besides, for a silent air compressor, the air tube and the tube slot require high manufacturing precision. Therefore, the liquid-bearing tonearm device has a lower cost compared to the conventional air-bearing tonearm and can read the signals in a better way.

Figure 5:
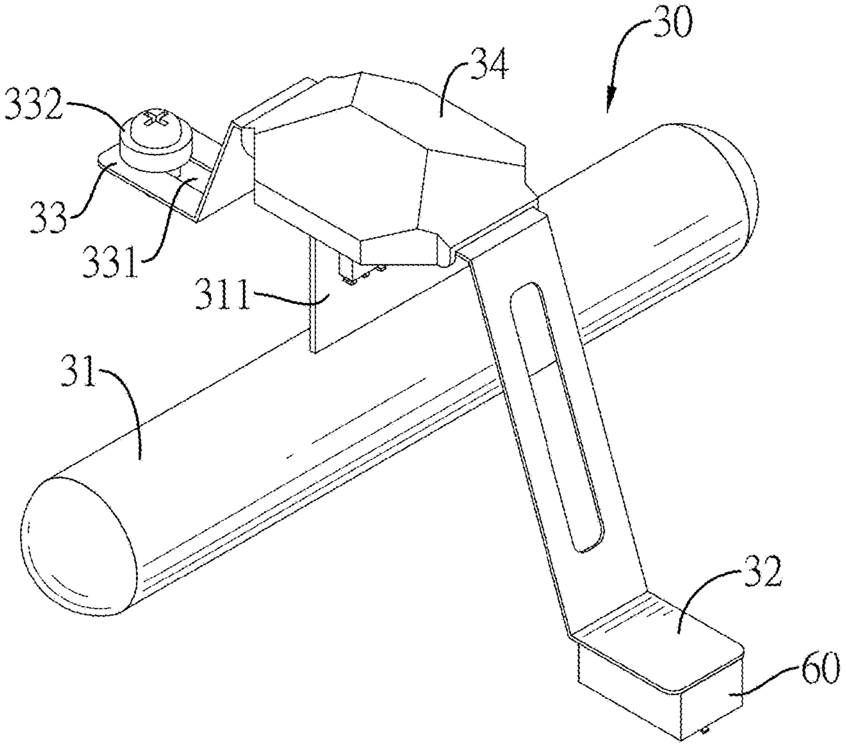
FIG. 5 is a perspective view of a cartridge assembly of the liquid-bearing tonearm device in FIG. 1.
Figure 6:
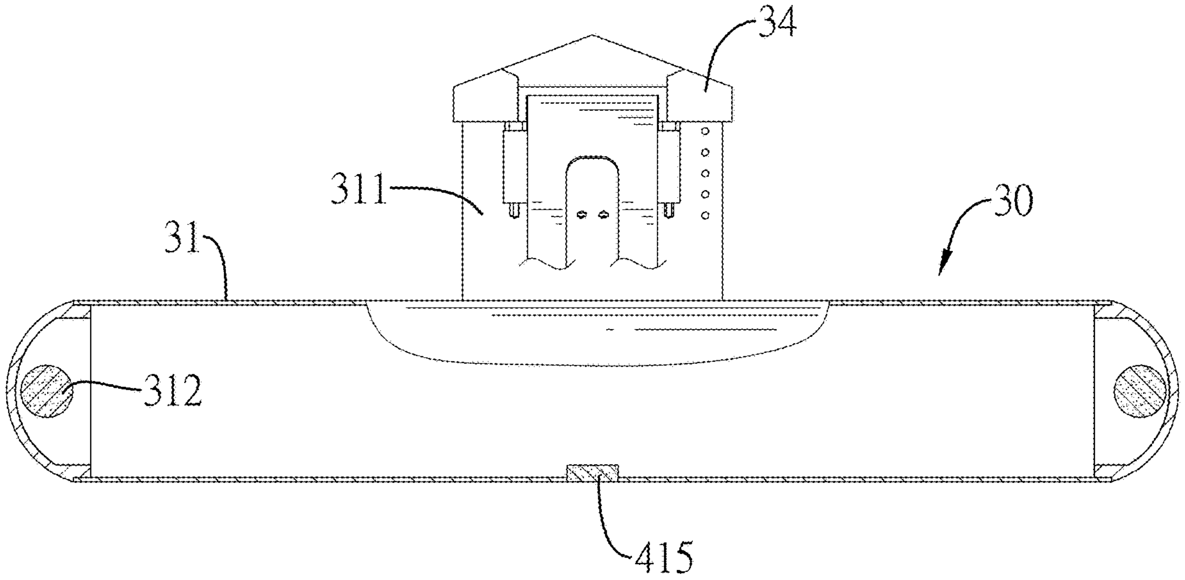
FIG. 6 is a partial sectional side view of the cartridge assembly of the liquid-bearing tonearm device in FIG. 1.
Figure 7:
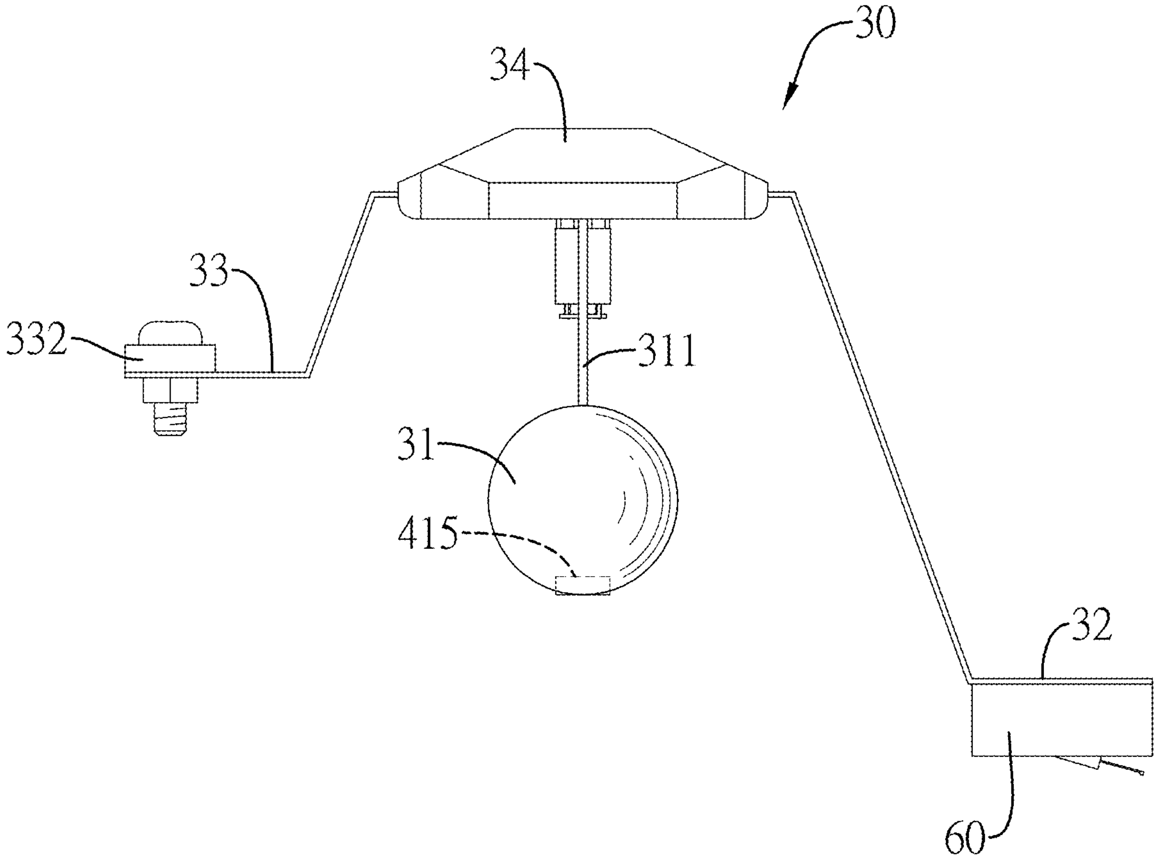
FIG. 7 is a front view of the cartridge assembly of the liquid-bearing tonearm device in FIG. 1.

In addition, with reference to FIGS. 5 to 7, various cartridges 60 can be assembled to the stylus portion 32 of the cartridge assembly 30, such as dynamic-type and moving-magnet-type cartridges. Different types of cartridges 60 express different characteristics of music, so users can change the cartridge 60 according to preferences. Furthermore, in one embodiment of the liquid-bearing tonearm device, the floating piece 31 has a connecting portion 311 disposed on a top side of the floating piece 31. The supporting rack 34 is detachably mounted at the connecting portion 311. The floating piece 31 is disposed between the stylus portion 32 and the counterweight portion 33. A user can have several supporting racks 34 and respectively assemble different cartridges 60 to the stylus portion 32 of a different one of the supporting racks 34, and then adjust the counterweight portion 33 of each supporting rack 34 according to the corresponding supporting rack 34. The detachable design of the supporting rack 34 and the connecting portion

311 of the floating piece 31 facilitates the user to quickly change different cartridges 60, increasing convenience of using the liquid-bearing tonearm device.

Additionally, as shown in FIGS. 3 and 4, the liquid tank 20 has a signal-transmitting element 23 mounted at an outer side of the liquid tank 20 and elongated along the linear direction. One end of the signal-transmitting element 23 is electrically connected to the connecting portion 311 through signal wires, and another end of the signal-transmitting element 23 is electrically connected to an external cartridge signal amplifier. Because the signal-transmitting element 23 electrically connects the connecting portion 311 of the floating piece 31 and the external cartridge signal amplifier, wiring of the cartridge assembly 30 is simplified, reducing a resistance of wiring when the cartridge assembly 30 is moved.

Besides, as shown in FIGS. 5 and 7, the counterweight portion 33 of the cartridge assembly 30 comprises an altering hole 331 and a counterweight element 332. The altering hole 331 is disposed and formed on the supporting rack 34, and elongated toward the stylus portion 32. The counterweight element 332 is movably mounted at the altering hole 331. A position of the counterweight element 332 on the altering hole 331 is alterable. Altering the position of the counterweight element 332 on the altering hole 331 balances a weight of the stylus portion 32. When changing the cartridge 60 on the cartridge assembly 30, readjusting the counterweight portion 33 can rebalance the cartridge assembly 30. When the liquid-bearing tonearm device is operated, the stylus portion 32 of the cartridge assembly 30 is slightly heavier than the counterweight portion 33, so the cartridge 60 on the stylus portion 32 naturally remains in contact with the record 51.

Additionally, as shown in FIGS. 3, 4 and 8, in a configuration of the liquid-bearing tonearm device, the liquid tank 20 has a resisting magnet set 24 mounted at a front-side wall of the resisting magnet set 24 and elongated along the linear direction. A magnetic force direction of the resisting magnet set 24 faces the floating piece 31 in the liquid tank 20. The floating piece 31 of the cartridge assembly 30 has at least one repulsive magnet 312, which is mounted inside the floating piece 31, has a magnetic force direction facing the resisting magnet set 24 and is in magnetic repulsion with the resisting magnet set 24. While the cartridge assembly 30 is moved along the liquid tank 20, the resisting magnet set 24 and the at least one repulsive magnet 312 of the floating piece 31 are in magnetic repulsion, thereby preventing or reducing chances that the cartridge assembly 30 scratches inner walls of the liquid tank 20 when the cartridge 60 on the cartridge assembly 30 is pulled by the grooves of the record 51. Hence, the cartridge assembly 30 remains moving linearly and smoothly. In another configuration of the liquid-bearing tonearm device, the liquid tank 20 has two resisting magnet sets 24 respectively mounted at the front-side wall and a rear-side wall of the liquid tank 20 and respectively elongated along the linear direction. The at least one repulsive magnet 312 has two sides respectively in magnetic repulsion with the two resisting magnet sets 24, thereby having the same effect, that is, making the cartridge assembly 30 remain moving linearly and smoothly.

With reference to FIGS. 1, 2, 9 and 10, the liquid-bearing tonearm device comprises a cartridge-adjusting bar 40 movably mounted at the liquid tank 20 and can be operated to contact the cartridge assembly 30 to sway the cartridge assembly 30 and lift the stylus portion 32.

The cartridge-adjusting bar 40 can be electrically operated. For example, as shown in FIGS. 1 to 3 and 10, the liquid-bearing tonearm device comprises a bar-lifting assembly 41 comprising a bar-lifting motor 411 and two auto-lifting switches 412. The bar-lifting motor 411 is mounted at the liquid tank 20 and is connected to the cartridge-adjusting bar 40. The two auto-lifting switches 412 are mounted at the liquid tank 20 and are electrically connected to the bar-lifting motor 411. The bar-lifting motor 411 is controlled to swing the cartridge-adjusting bar 40 upwardly or downwardly, until the cartridge-adjusting bar 40 contacts one of the two auto-lifting switches 412 to automatically stop the bar-lifting motor 411. Electrically operating and controlling the cartridge-adjusting bar 40 increases convenience of use of the liquid-bearing tonearm device. Besides, the bar-lifting motor 411 can be powered by external electricity source or by batteries 413 mounted at the liquid tank 20.

Moreover, the bar-lifting motor 411 can be controlled in various ways. In an embodiment of the liquid-bearing tonearm device, as shown in FIG. 3, the bar-lifting assembly 41 comprises a controlling-bottom set 414 comprising a bar-lifting bottom and a bar-lowering bottom. The bar-lifting bottom and the bar-lowering bottom of the controlling-bottom set 414 respectively are electrically connected to the bar-lifting motor 411 and control the bar-lifting motor 411. When the bottoms of the controlling-bottom set 414 are pushed, the bar-lifting motor 411 is controlled to swing the cartridge-adjusting bar 40 upwardly or downwardly, so the cartridge-adjusting bar 40 is swung and lifts or lowers the stylus portion 32, facilitating manual controls of the bar-lifting motor 411.

Besides, as shown in FIGS. 4, 6 and 8, the bar-lifting assembly 41 comprises a triggering element 415 and a sensing switch 416. The triggering element 415 is mounted at the floating piece 31. The sensing switch 416 can be a magnetic reed switch or a hall sensor. The sensing switch 416 is mounted at an end, away from the base seat 10, of the liquid tank 20 and is electrically connected to the bar-lifting motor 411. When the triggering element 415 is adjacent to the sensing switch 416, the sensing switch 416 is triggered to control the bar-lifting motor 411 to swing the cartridge-adjusting bar 40 upwardly. When the cartridge assembly 30 is moved along with rotations of the record 51 to a position in the liquid tank 20 where the record 51 finishes playing, the triggering element 415 on the floating piece 31 triggers the sensing switch 416. Automatically, the bar-lifting motor 411 operates and lifts the cartridge-adjusting bar 40, the stylus portion 32 hence is lifted and is detached from the record 51 to stop playing music.

With reference to FIGS. 2, 3 and 6, in a configuration of the base seat 10, the base seat 10 comprises an outer tube 12, an inner tube 13 and an assembling cap 14. The outer tube 12 is arranged vertically. The inner tube 13 extends into the outer tube 12 and is rotatable relative to the outer tube 12. The assembling cap 14 is mounted on a top side of the inner tube 13 and covers a top end of the outer tube 12. The assembling portion 11 is disposed at a top side of the assembling cap 14.

In addition, a height of the base seat 10 is alterable according to various turntables. For example, in a configuration of the base seat 10, as shown in FIGS. 11 and 12, the height of the base seat 10 is shorter. There are no limitations for the height of the base seat 10 other than being high enough for the liquid tank 20 to be disposed over the record 51 while the stylus portion 32 can still contact the record 51. In said configuration, the liquid tank 20 is disposed over and at the rear side of the turntable 50 and the record 51. The supporting rack 34 is lengthened so that the cartridge 60 on the stylus portion 32 can contact the grooves of the record 51. Because the liquid tank 20 is disposed at the rear side of the record 51, when the supporting rack 34 is lifted to stop playing music, moving the supporting rack 34 away from the record 51, and the record 51 can be easily exchanged, facilitating the convenience of use.

When exchanging the record 51 or to stop the liquid-bearing tonearm device, pushing to horizontally pivot the liquid tank 20 relative to the base seat 10, the cartridge assembly 30 is moved away from the record 51 to facilitate changing the record 51. Furthermore, the liquid tank 20 is connected to the assembling cap 14, which is fixed and mounted at the top side of the inner tube 13, so the liquid tank 20 and the inner tube 13 are fixed together. Because the inner tube 13 extends into the outer tube 12, connecting stability between the liquid tank 20 and the base seat 10 is enhanced, while the liquid tank 20 can be freely pivoted relative to the base seat 10.

Figure 13:
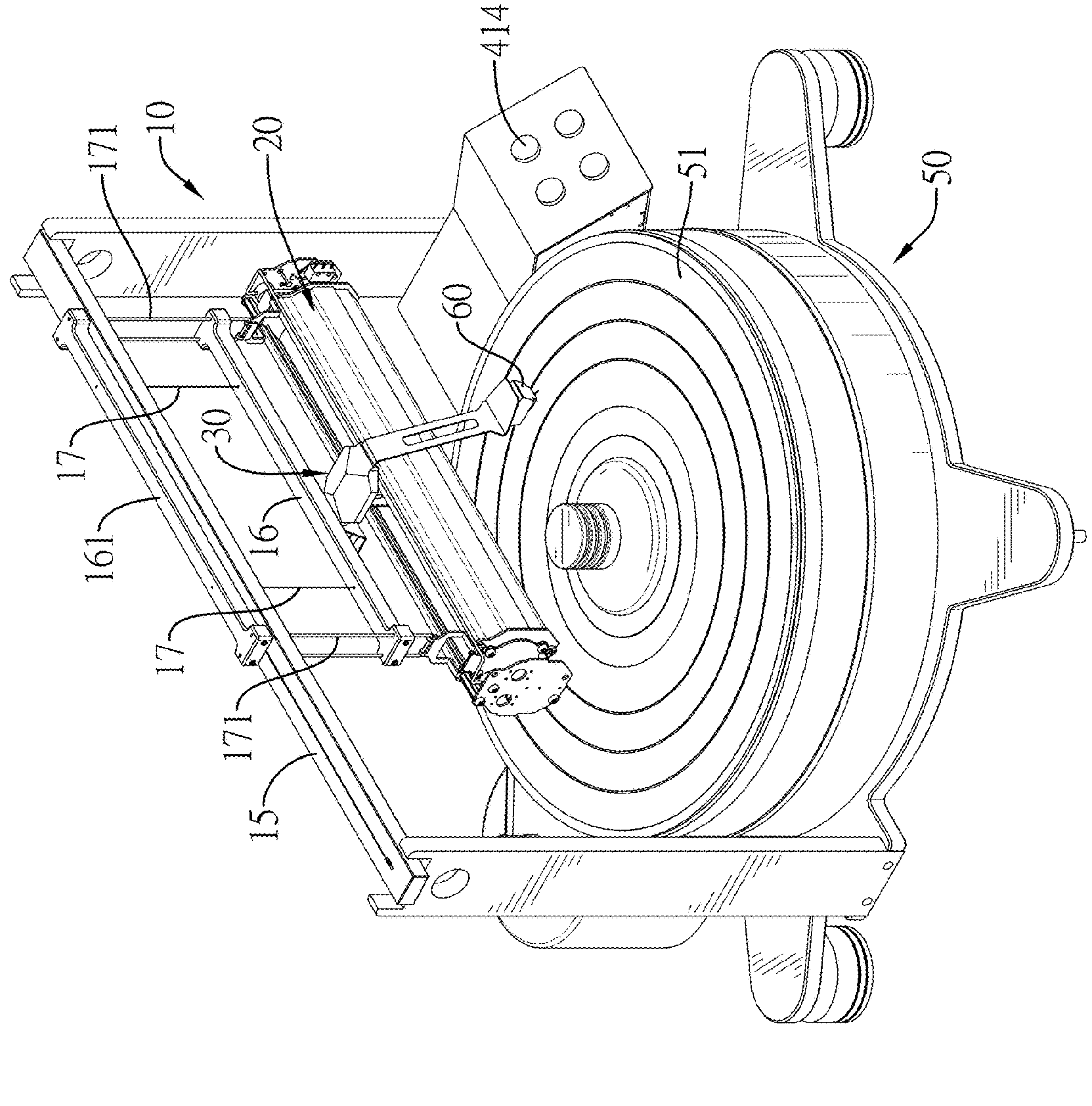
FIG. 13 is a perspective view of the liquid-bearing tonearm device, with another configuration of the base seat of the liquid-bearing tonearm device.
Figure 14:
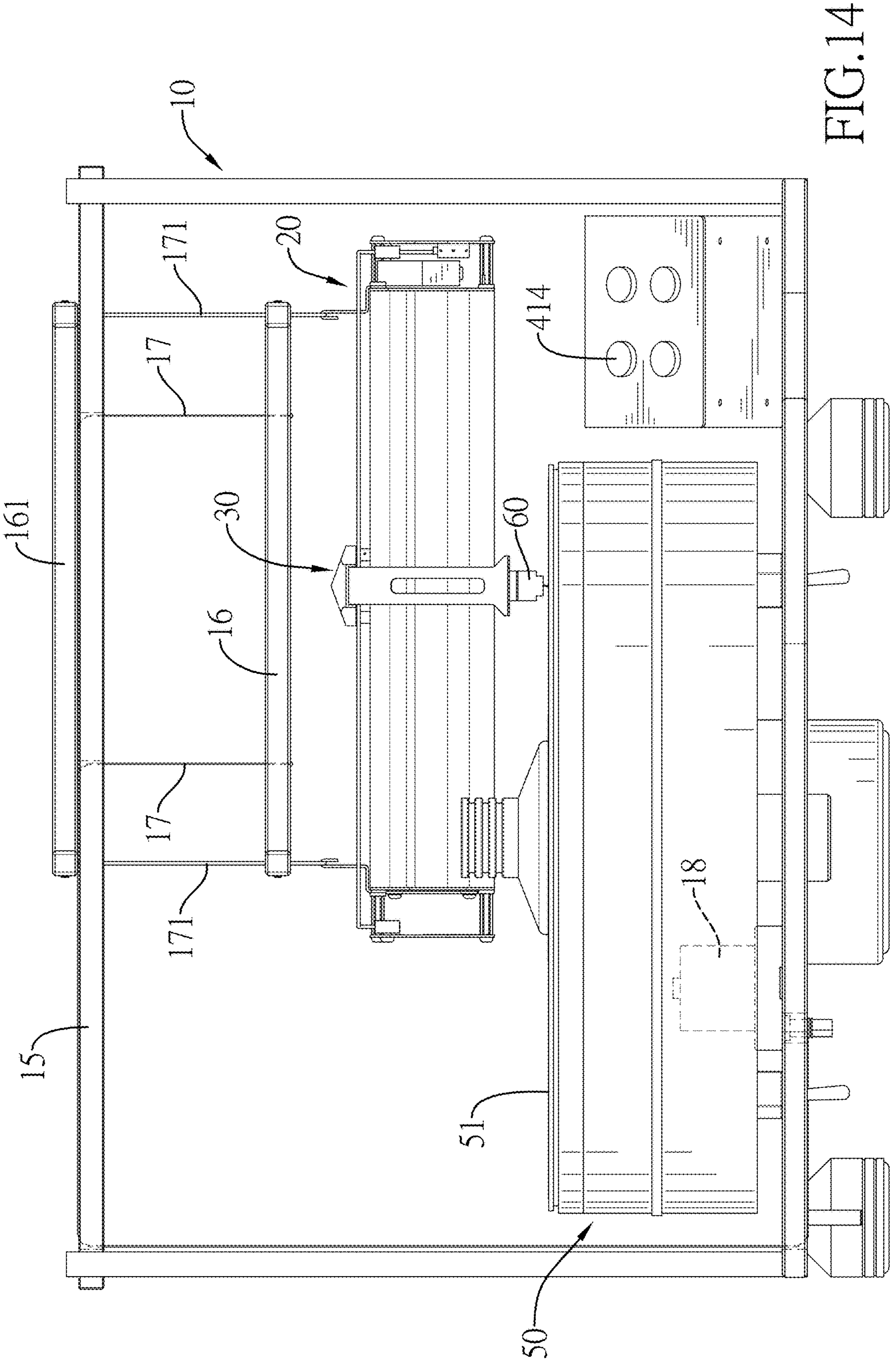
FIG. 14 is a side view of the liquid-bearing tonearm device in FIG. 13.

Besides, in another configuration of the base seat 10, as shown in FIGS. 13 and 14, the base seat 10 is a suspension seat. The base seat 10 comprises a suspension rack 15, a lifting rod 16, a lifting-driven rod 161, two driven sticks 171, two suspension wires 17, and a wire-rolling motor 18. The suspension rack 15 is disposed across and over the turntable 50. The lifting-driven rod 161 is mounted at the suspension rack 15. The lifting rod 16 is disposed between the suspension rack 15 and the liquid tank 20. The two driven sticks 171 pass through the suspension rack 15 and are connected to the lifting rod 16, and the lifting-driven rod 161 is connected to two ends of the liquid tank 20. Each one of the two suspension wires 17 has two ends, one of the ends is connected to the lifting rod 16, and the other end extends along the suspension rack 15 to connect the wire-rolling motor 18 disposed under the turntable 50. The wire-rolling motor 18 rotates forwardly or backwardly to release or collect the two suspension wires 17 to lower or lift the lifting rod 16 and the liquid tank 20. When the liquid tank 20 is lifted to an idle position, the lifting rod 16 contacts the suspension rack 15, so the liquid tank 20 is stopped, allowing to change the record 51. When the liquid tank 20 is lowered to a preset position, the lifting-driven rod 161 contacts the suspension rack 15, the liquid tank 20 so is stopped, and the stylus portion 32 contacts the record 51. This suspension design of the base seat 10 also can hold the liquid tank 20 over the record 51.

To sum up, the liquid-bearing tonearm device is used with a turntable 50 to play music. The containing chamber 21 of the liquid tank 20 contains the working liquid, so the cartridge assembly 30 can float in the liquid tank 20 through the floating piece 31. The needle of the cartridge 60 on the stylus portion 32 contacts the record 51 on the turntable 50. Because the cartridge assembly 30 is moved along the linear direction from the outside to the inside of the record 51 while the record 51 is spun, the contacting angle between the needle of the cartridge 60 and the grooves of the record 51 remains parallel. Therefore, the needle of the cartridge 60 reads the signals in a better way to ensure the sound quality.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A liquid-bearing tonearm device configured to read a record on a turntable, the liquid-bearing tonearm device comprising:
- a base seat disposed adjacent to the turntable;
- a liquid tank mounted at the base seat, disposed over the turntable and the record, and spaced apart from the record; the liquid tank elongated along a linear direction and having
  - a containing chamber disposed inside the liquid tank and containing working liquid;
  - a tank opening disposed on a top side of the liquid tank and communicating with the containing chamber;
  - a resisting magnet set mounted at a front-side wall of the liquid tank and elongated along the linear direction;
- a cartridge assembly comprising
  - a floating piece disposed at the containing chamber of the liquid tank; and having:
    - at least one repulsive magnet mounted inside the floating piece and having a side in magnetic repulsion with the resisting magnet set;
  - a supporting rack passing through the tank opening of the liquid tank to connect the floating piece and having
    - a stylus portion contacting the record to read grooves of the record;
    - a counterweight portion; the stylus portion and the counterweight portion respectively disposed at two ends of the supporting rack and respectively disposed at two sides of the liquid tank;
- wherein a specific weight of the floating piece is smaller than a specific weight of the working liquid, such that the supporting rack floats on the working liquid in the liquid tank through the floating piece; by floating, the cartridge assembly is able to sway upwardly and downwardly and to be moved along the linear direction on the working liquid in the liquid tank;
- wherein the front-side wall of the liquid tank is located between the floating piece and the stylus portion of the cartridge assembly.

2. The liquid-bearing tonearm device as claimed in claim 1, wherein
- the base seat comprises
  - an outer tube arranged vertically;
  - an inner tube extending into the outer tube and being rotatable relative to the outer tube;
  - an assembling cap mounted on top of the inner tube, covering a top end of the outer tube, and having
    - an assembling portion on a top end of the assembling cap;
- the liquid tank is mounted at the assembling portion and is elongated along a direction away from the base seat.

3. The liquid-bearing tonearm device as claimed in claim 2, wherein
- the liquid-bearing tonearm device comprises
  - a cartridge-adjusting bar movably mounted at the liquid tank, elongated along the linear direction, and being operable to contact the supporting rack of the cartridge assembly to swing the cartridge assembly, thereby lifting the stylus portion away from the record; and
  - a bar-lifting assembly comprising
    - a bar-lifting motor mounted at the liquid tank and connected to the cartridge-adjusting bar;
    - two auto-lifting switches mounted at the liquid tank and electrically connected to the bar-lifting motor;

the bar-lifting motor is controlled to swing the cartridge-adjusting bar upwardly or downwardly, until the cartridge-adjusting bar contacts one of the two auto-lifting switches to stop the bar-lifting motor.

4. The liquid-bearing tonearm device as claimed in claim 1, wherein
the floating piece has
a connecting portion disposed at a top side of the floating piece;
the supporting rack is detachably mounted at the connecting portion;
the floating piece is disposed between the stylus portion and the counterweight portion; and
the stylus portion is configured to be assembled with a cartridge.

5. The liquid-bearing tonearm device as claimed in claim 4, wherein
the liquid-bearing tonearm device comprises
a cartridge-adjusting bar movably mounted at the liquid tank, elongated along the linear direction, and being operable to contact the supporting rack of the cartridge assembly to swing the cartridge assembly, thereby lifting the stylus portion away from the record; and
a bar-lifting assembly comprising
a bar-lifting motor mounted at the liquid tank and connected to the cartridge-adjusting bar;
two auto-lifting switches mounted at the liquid tank and electrically connected to the bar-lifting motor;
the bar-lifting motor is controlled to swing the cartridge-adjusting bar upwardly or downwardly, until the cartridge-adjusting bar contacts one of the two auto-lifting switches to stop the bar-lifting motor.

6. The liquid-bearing tonearm device as claimed in claim 1, wherein
the counterweight portion comprises
an altering hole disposed at the supporting rack and elongated toward the stylus portion;
a counterweight element movably mounted at the altering hole; and
a position of the counterweight element on the altering hole is alterable.

7. The liquid-bearing tonearm device as claimed in claim 6, wherein
the liquid-bearing tonearm device comprises
a cartridge-adjusting bar movably mounted at the liquid tank, elongated along the linear direction, and being operable to contact the supporting rack of the cartridge assembly to swing the cartridge assembly, thereby lifting the stylus portion away from the record; and
a bar-lifting assembly comprising
a bar-lifting motor mounted at the liquid tank and connected to the cartridge-adjusting bar;
two auto-lifting switches mounted at the liquid tank and electrically connected to the bar-lifting motor;
the bar-lifting motor is controlled to swing the cartridge-adjusting bar upwardly or downwardly, until the cartridge-adjusting bar contacts one of the two auto-lifting switches to stop the bar-lifting motor.

8. The liquid-bearing tonearm device as claimed in claim 7, wherein the bar-lifting assembly comprises
a controlling-bottom set comprising
a bar-lifting bottom and a bar-lowering bottom electrically connected to and respectively controlling the bar-lifting motor to swing the cartridge-adjusting bar to lift or lower the stylus portion.

9. The liquid-bearing tonearm device as claimed in claim 8, wherein
the bar-lifting assembly comprises
a triggering element mounted at the floating piece;
a sensor switch mounted at the liquid tank, disposed at an end, away from the base seat, of the liquid tank, and electrically connected to the bar-lifting motor;
when moved to be adjacent to the sensor switch, the triggering element triggers the sensor switch to operate the bar-lifting motor to swing the cartridge-adjusting bar upwardly, such that the stylus portion is lifted away from the record.

10. The liquid-bearing tonearm device as claimed in claim 7, wherein
the bar-lifting assembly comprises
a triggering element mounted at the floating piece;
a sensor switch mounted at the liquid tank, disposed at an end, away from the base seat, of the liquid tank, and electrically connected to the bar-lifting motor;
when moved to be adjacent to the sensor switch, the triggering element triggers the sensor switch to operate the bar-lifting motor to swing the cartridge-adjusting bar upwardly, such that the stylus portion is lifted away from the record.

11. A liquid-bearing tonearm device configured to read a record on a turntable, the liquid-bearing tonearm device comprising:
a base seat disposed adjacent to the turntable;
a liquid tank mounted at the base seat, disposed over the turntable and the record, and spaced apart from the record; the liquid tank elongated along a linear direction and having
a containing chamber disposed inside the liquid tank and containing working liquid;
a tank opening disposed on a top side of the liquid tank and communicating with the containing chamber;
a resisting magnet set mounted at a front-side wall of the liquid tank and elongated along the linear direction;
a cartridge assembly comprising
a floating piece disposed at the containing chamber of the liquid tank; and having:
at least one repulsive magnet mounted inside the floating piece and having a side in magnetic repulsion with the resisting magnet set;
a supporting rack passing through the tank opening of the liquid tank to connect the floating piece and having
a stylus portion contacting the record to read grooves of the record;
a counterweight portion; the stylus portion and the counterweight portion respectively disposed at two ends of the supporting rack and respectively disposed at two sides of the liquid tank;
wherein a specific weight of the floating piece is smaller than a specific weight of the working liquid, such that the supporting rack floats on the working liquid in the liquid tank through the floating piece; by floating, the cartridge assembly is able to sway upwardly and downwardly and to be moved along the linear direction on the working liquid in the liquid tank; wherein
the base seat comprises
a suspension rack disposed across and over the turntable;
a lifting rod disposed between the suspension rack and the liquid tank;
a lifting-driven rod mounted at the suspension rack;

two driven sticks passing through the suspension rack, connected to the lifting rod and the lifting-driven rod, and respectively connected to two ends of the liquid tank;

a wire-rolling motor disposed under the turntable;

two suspension wires; each one of the two suspension wires having two ends, one of the two ends connected to the lifting rod, the other one of the two ends extending along the suspension rack and connected to the wire-rolling motor;

the wire-rolling motor rotates forwardly or backwardly to release or collect the two suspension wires to lower or lift the lifting rod and the liquid tank; and when the liquid tank is lowered to a preset position, the lifting-driven rod stops the liquid tank.

12. The liquid-bearing tonearm device as claimed in claim 11, wherein the liquid-bearing tonearm device comprises a cartridge-adjusting bar movably mounted at the liquid tank, elongated along the linear direction, and being operable to contact the supporting rack of the cartridge assembly to swing the cartridge assembly, thereby lifting the stylus portion away from the record; and a bar-lifting assembly comprising a bar-lifting motor mounted at the liquid tank and connected to the cartridge-adjusting bar;

two auto-lifting switches mounted at the liquid tank and electrically connected to the bar-lifting motor;

the bar-lifting motor is controlled to swing the cartridge-adjusting bar upwardly or downwardly, until the cartridge-adjusting bar contacts one of the two auto-lifting switches to stop the bar-lifting motor.

13. A liquid-bearing tonearm device configured to read a record on a turntable, the liquid-bearing tonearm device comprising:

a base seat disposed adjacent to the turntable;

a liquid tank mounted at the base seat, disposed over the turntable and the record, and spaced apart from the record; the liquid tank elongated along a linear direction and having a containing chamber disposed inside the liquid tank and containing working liquid;

a tank opening disposed on a top side of the liquid tank and communicating with the containing chamber;

a resisting magnet set mounted at a front-side wall of the liquid tank and elongated along the linear direction;

a cartridge assembly comprising a floating piece disposed at the containing chamber of the liquid tank; and having:

at least one repulsive magnet mounted inside the floating piece and having a side in magnetic repulsion with the resisting magnet set;

a supporting rack passing through the tank opening of the liquid tank to connect the floating piece and having a stylus portion contacting the record to read grooves of the record;

a counterweight portion; the stylus portion and the counterweight portion respectively disposed at two ends of the supporting rack and respectively disposed at two sides of the liquid tank;

wherein a specific weight of the floating piece is smaller than a specific weight of the working liquid, such that the supporting rack floats on the working liquid in the liquid tank through the floating piece; by floating, the cartridge assembly is able to sway upwardly and downwardly and to be moved along the linear direction on the working liquid in the liquid tank; wherein the liquid-bearing tonearm device comprises a cartridge-adjusting bar movably mounted at the liquid tank, elongated along the linear direction, and being operable to contact the supporting rack of the cartridge assembly to swing the cartridge assembly, thereby lifting the stylus portion away from the record; and a bar-lifting assembly comprising a bar-lifting motor mounted at the liquid tank and connected to the cartridge-adjusting bar;

two auto-lifting switches mounted at the liquid tank and electrically connected to the bar-lifting motor;

the bar-lifting motor is controlled to swing the cartridge-adjusting bar upwardly or downwardly, until the cartridge-adjusting bar contacts one of the two auto-lifting switches to stop the bar-lifting motor.

14. The liquid-bearing tonearm device as claimed in claim 13, wherein the bar-lifting assembly comprises a controlling-bottom set comprising a bar-lifting bottom and a bar-lowering bottom electrically connected to and respectively controlling the bar-lifting motor to swing the cartridge-adjusting bar to lift or lower the stylus portion.

15. The liquid-bearing tonearm device as claimed in claim 14, wherein the bar-lifting assembly comprises a triggering element mounted at the floating piece;

a sensor switch mounted at the liquid tank, disposed at an end, away from the base seat, of the liquid tank, and electrically connected to the bar-lifting motor;

when moved to be adjacent to the sensor switch, the triggering element triggers the sensor switch to operate the bar-lifting motor to swing the cartridge-adjusting bar upwardly, such that the stylus portion is lifted away from the record.

16. The liquid-bearing tonearm device as claimed in claim 13, wherein the bar-lifting assembly comprises a triggering element mounted at the floating piece;

a sensor switch mounted at the liquid tank, disposed at an end, away from the base seat, of the liquid tank, and electrically connected to the bar-lifting motor;

when moved to be adjacent to the sensor switch, the triggering element triggers the sensor switch to operate the bar-lifting motor to swing the cartridge-adjusting bar upwardly, such that the stylus portion is lifted away from the record.

* * * * *